(12) United States Patent
Wang et al.

(10) Patent No.: US 11,326,685 B2
(45) Date of Patent: May 10, 2022

(54) LINEAR MODULE AND OPERATING METHOD THEREOF

(71) Applicant: SHANGHAI MICRO ELECTRONICS EQUIPMENT (GROUP) CO., LTD., Shanghai (CN)

(72) Inventors: Gang Wang, Shanghai (CN); Junpeng Chen, Shanghai (CN); Dongliang Huang, Shanghai (CN)

(73) Assignee: SHANGHAI MICRO ELECTRONICS EQUIPMENT (GROUP) CO., LTD, Shanghai (CN)

( * ) Notice: Subject to any disclaimer, the term of this patent is extended or adjusted under 35 U.S.C. 154(b) by 175 days.

(21) Appl. No.: 16/643,299

(22) PCT Filed: Aug. 30, 2018

(86) PCT No.: PCT/CN2018/103135
§ 371 (c)(1),
(2) Date: Feb. 28, 2020

(87) PCT Pub. No.: WO2019/042338
PCT Pub. Date: Mar. 7, 2019

(65) Prior Publication Data
US 2020/0347926 A1 Nov. 5, 2020

(30) Foreign Application Priority Data
Aug. 31, 2017 (CN) .......................... 201710776008.0

(51) Int. Cl.
*F16H 19/06* (2006.01)
*F16H 57/029* (2012.01)
(Continued)

(52) U.S. Cl.
CPC ....... *F16H 57/029* (2013.01); *F16H 25/2015* (2013.01); *F16H 57/031* (2013.01);
(Continued)

(58) Field of Classification Search
CPC .......................... F16H 19/06; Y10T 74/18648
(Continued)

(56) References Cited

U.S. PATENT DOCUMENTS 3,730,007 A * 5/1973 Wellington ............. F16H 19/06
74/89.2
4,545,290 A * 10/1985 Lieberman ............ F15B 15/082
92/88
(Continued)

FOREIGN PATENT DOCUMENTS

CN 101802453 A 8/2010
CN 104518602 A 4/2015
(Continued)

*Primary Examiner* — Randell J Krug
(74) *Attorney, Agent, or Firm* — Muncy, Geissler, Olds & Lowe, PC

(57) ABSTRACT

The present invention provides a linear module, which includes a casing, and a linear transmission device (20). The casing has an internal cavity, in which the linear transmission device (20) is at least partially disposed, and an output opening (31) which extends along a movement direction of the linear transmission device (20) defined on the case. A sealing band (32) is arranged at the output opening (31). The linear module further includes a first rolling mechanism (50) which is moveable in synchronization with the linear transmission device (20) and is arranged on a side of the sealing band (32) which is away from the internal cavity. The first rolling mechanism (50) is in rolling contact with the sealing band (32). This linear module enables high cleanliness and has good sealing performance, high accuracy and high stability.

13 Claims, 3 Drawing Sheets

(51) Int. Cl.
*F16H 25/20* (2006.01)
*F16H 57/031* (2012.01)
*F16J 15/3284* (2016.01)

(52) U.S. Cl.
CPC ......... *F16J 15/3284* (2013.01); *F16H 19/06* (2013.01); *F16H 2025/204* (2013.01); *F16H 2025/2031* (2013.01)

(58) Field of Classification Search
USPC ...................................................... 74/89.32
See application file for complete search history.

(56) References Cited

U.S. PATENT DOCUMENTS

| | | | | |
|---|---|---|---|---|
| 5,106,205 A * | 4/1992 | Coron | ................. | B23Q 11/085 384/15 |
| 5,590,850 A * | 1/1997 | Cannon | .................... | F41G 7/22 244/3.15 |
| 6,571,931 B2 * | 6/2003 | Oden | ..................... | G07F 1/045 194/348 |
| 6,857,780 B2 * | 2/2005 | Morr | .................... | F16C 29/082 384/15 |
| 8,272,286 B2 * | 9/2012 | Aso | ....................... | F16C 29/082 74/89.4 |
| 8,302,498 B2 * | 11/2012 | Shirai | ................... | F16C 29/063 74/89.4 |
| 8,650,978 B2 * | 2/2014 | Aso | ....................... | F16C 29/082 74/89.41 |
| 8,925,408 B2 * | 1/2015 | Sakai | ................... | F16C 29/088 74/89.4 |
| 10,533,604 B2 * | 1/2020 | Wang | ...................... | F16C 29/08 |

FOREIGN PATENT DOCUMENTS

| | | |
|---|---|---|
| CN | 105082126 A | 11/2015 |
| CN | 204872552 U | 12/2015 |
| CN | 204913892 U | 12/2015 |
| CN | 205036807 U | 2/2016 |
| CN | 206092696 U | 4/2017 |
| CN | 206326440 U | 7/2017 |
| FR | 2684034 A1 | 5/1993 |
| JP | H05 106703 A | 4/1993 |
| JP | 2012157937 A | 8/2012 |
| JP | 5465017 B2 | 4/2014 |
| KR | 200471406 Y1 | 2/2014 |

* cited by examiner

LINEAR MODULE AND OPERATING METHOD THEREOF

TECHNICAL FIELD

The present invention relates to a linear module and, more specifically, to a linear module with a dustproof feature for a sealing band.

BACKGROUND

Linear modules are devices used for linear transmission and generally categorized, by their transmission mechanisms, into belt-type ones and screw-type ones.

Existing linear modules typically includes a casing and a linear transmission device. The casing has an internal cavity, an output opening extending through the internal cavity and a sealing band disposed over the output opening. The linear transmission device is at least partially disposed within the internal cavity and has an output end that extends across a gap between the output opening and the sealing band and engages with an external actuator. Such a linear module can prevent both the ingress of external dust, which may affect the service life and motion accuracy of the linear module, and egress of vapors of lubricating oils or greases and metal particles generated from friction, which may harm the external environment. Therefore, they are widely used in the field of automation industries, especially in semiconductor fabrication applications that require high cleanliness of the fabrication environments as well as of the fabrication equipment itself.

However, the sealing band of such a linear module is susceptible to deformation and wear over time, which can degrade the motion smoothness of the linear transmission device and thus the accuracy and stability of the linear module. In addition, it is still possible for some of the generated particles to escape and adversely affect the cleanliness of the fabrication environment and equipment. Moreover, the sealing band will have a worse sealing ability after deformation, and thus the particles generated in the linear module are more likely to escape out to affect the cleanliness of the fabrication environment and equipment.

SUMMARY OF THE INVENTION

The present invention seeks to provide a linear module that enables high cleanliness and has good sealing performance, high accuracy and high stability.

To this end, the present invention provides a linear module, comprising a casing and a linear transmission device, wherein the casing has an internal cavity in which the linear transmission device is at least partially disposed, the casing defines thereon an output opening which extends along a movement direction of the linear transmission device, a sealing band is provided at the output opening, wherein the linear module further comprises a first rolling mechanism which is moveable in synchronization with the linear transmission device, the first rolling mechanism is arranged on a side of the sealing band that is away from the internal cavity, and the first rolling mechanism is in rolling contact with the sealing band.

Additionally, the linear module further comprises a second rolling mechanism which is moveable in synchronization with the linear transmission device, the second rolling mechanism is arranged on a side of the sealing band that faces towards the internal cavity, and the second rolling mechanism is in rolling contact with the sealing band.

Additionally, a number of the second rolling mechanism is one and a number of the first rolling mechanisms is more than one, wherein the first rolling mechanisms are disposed symmetrically on opposing sides of the second rolling mechanism along the movement direction of the linear transmission assembly.

Additionally, the number of the first rolling mechanisms is two.

Additionally, a number of the second rolling mechanisms is more than one, wherein the second rolling mechanisms are spaced apart from one another along the movement direction of the linear transmission device; a number of the first rolling mechanisms is two, wherein the first rolling mechanisms are disposed symmetrically on opposing sides of the second rolling mechanisms along the movement direction of the linear transmission device.

Additionally, the number of the second rolling mechanisms is two.

Additionally, the linear transmission device comprises a slide table configured for linear movement, the first rolling mechanism(s) and the second rolling mechanism(s) are arranged on and in rolling connection with the slide table.

Additionally, the first rolling mechanism(s) is/are disposed close to an edge of the slide table and the second rolling mechanism(s) is/are disposed inside the slide table.

Additionally, the slide table comprises an adapter and a slide block fixed to the adapter, and wherein the second rolling mechanism(s) and first rolling mechanism(s) are arranged on the adapter and/or the slide block.

Additionally, the first rolling mechanism comprises a first wear-resistant rolling member which is in rolling contact with the sealing band, and the first wear-resistant rolling member is made of a magnetic wear-resistant material.

Additionally, the first rolling mechanism further comprises first bearing adjusting nuts, first bearings, first stop rings and a first support shaft, wherein the first bearings are sleeved over respective ends of the first support shaft and are fixed to the slide table, the first wear-resistant rolling member is fixed over the first support shaft, each of the first stop rings is sleeved over the first support shaft and is closer to the first wear-resistant rolling member and is configured to fix an outer ring of a corresponding one of the first bearings, each of the first bearing adjusting nuts is sleeved over the first support shaft and is farther away from the first wear-resistant rolling member and is configured to fix an inner ring of a corresponding one of the first bearings.

Additionally, the second rolling mechanism comprises a second wear-resistant rolling member which is in rolling contact with the sealing band, and the second wear-resistant rolling member is made of a lightweight wear-resistant material.

Additionally, the second rolling mechanism further comprises second bearing adjusting nuts, second bearings, second stop rings and a second support shaft, wherein the second bearings are sleeved over respective ends of the second support shaft and are fixed to the slide table, the second wear-resistant rolling member is fixed over the second support shaft, each of the second stop rings is sleeved over the second support shaft and is closer to the second wear-resistant rolling member and is configured to fix an outer ring of a corresponding one of the second bearings, each of the second bearing adjusting nuts is sleeved over the second support shaft and is farther away from the second wear-resistant rolling member and is configured to fix an inner ring of a corresponding one of the second bearing.

Additionally, the casing comprises a base and a cover arranged on the base, the internal cavity is formed between the base and the cover, the cover is provided with magnetic strips extending on both sides of the output opening along the movement direction of the linear transmission device, and the sealing band covers at least a part of each of the magnetic strips.

Additionally, the cover is provided with a front holder and a rear holder, and wherein the linear transmission device comprises a lead screw, a nut, a guide rail and bearings, all disposed within the casing, and a slide table disposed at least partially outside the casing, one end of the lead screw is disposed at the front holder via one of the bearings and extends through the front holder and is coupled to a driving apparatus arranged outside the casing, a further end of the lead screw is rotatably connected with the rear holder via a further one of the bearings, the nut is movably disposed over the lead screw and is connected to the slide table, the guide rail is disposed on the base, and the slide table is movably disposed on the guide rail.

The present invention also provides an operating method of a linear module, wherein the linear module comprises a casing, a linear transmission device and a first rolling mechanism, wherein the casing has an internal cavity in which the linear transmission device is at least partially disposed, the casing defines thereon an output opening and a sealing band is provided at the output opening, and wherein the operating method comprises:

causing the first rolling mechanism to move in synchronization with the linear transmission device, during which the first rolling mechanism rolls relative to the sealing band; and pressing, by the first rolling mechanism, a portion of the sealing band that is interacting with the linear transmission device toward the internal cavity.

Additionally, the linear module further comprises a second rolling mechanism, and wherein the operating method further comprises:

causing the second rolling mechanism to move in synchronization with the linear transmission device, during which the second rolling mechanism rolls relative to the sealing band; and lifting, by the second rolling mechanism, a portion of the sealing band that comes into contact with the second rolling mechanism, from the output opening in a direction away from the internal cavity, to form a gap.

The provided linear module according to the present invention has the benefits as follows:

1. Rolling contact occurs between the sealing band and second rolling mechanism of the linear module. Accordingly, during advancement of the linear transmission device, rolling friction, rather than sliding friction, occurs. This reduces the amount of particles generated from friction and lowers the likelihood of the wear and deformation of the sealing band under a significant frictional force or under the action of said particles, avoiding the situation that the cleanliness of the fabrication equipment and environment is negatively influenced by the particles, also avoiding the situation that the sealing ability of the linear module is degraded with the deformation of the sealing band, which leads to a further negative influence on cleanliness of the fabrication equipment and environment, also avoiding the situation that the smoothness of the linear transmission device in its movements is negatively influenced due to the deformation of the sealing band and the presence of the particles. As a result, high accuracy and stability of the linear module can be ensured.

2. The linear module is provided with the first rolling mechanism and the second rolling mechanism, and the two sides of the sealing band are in rolling contact with the first rolling mechanism and the second rolling mechanism respectively. Therefore, reductions in frictional resistance and hence in particle generation can be obtained. Moreover, the sealing band can be pressed toward the cover, minimizing the size of the gap formed between the sealing band and the cover during movement of the linear transmission device and hence the possibility of particles escaping from the inside of the linear module to the fabrication equipment and environment.

3. The magnetic strips are covered with the sealing band which is arranged on the cover, so that the sealing performance is increased and a small amount of the metal particles which are generated from the rolling friction can be collected in real time, thereby preventing other components of the fabrication equipment from of the dropped metal particles, which harms the cleanliness thereof. Additionally, this is also helpful in the cleaning and maintenance of the linear module.

DETAILED DESCRIPTION

Figure 1:
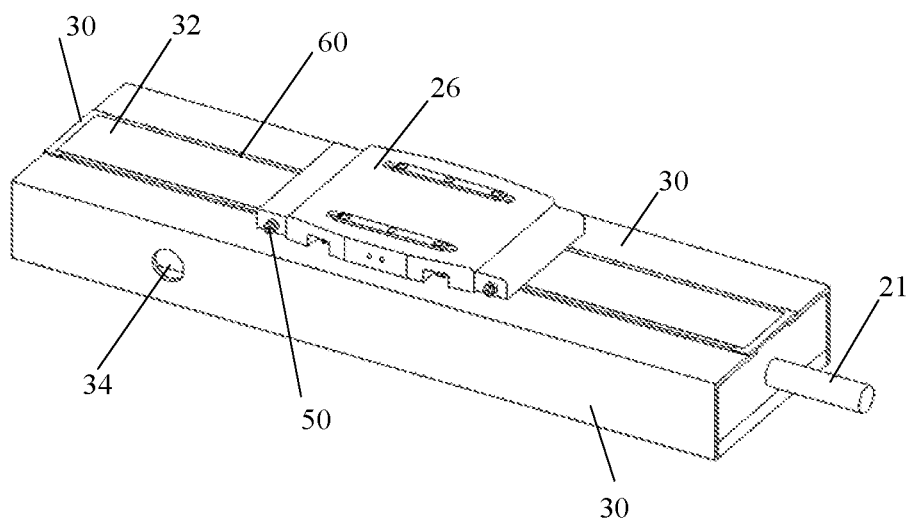
FIG. 1 is a schematic perspective view of a linear module according to an embodiment.

Despite the alleged ability of the existing linear modules to block particles generated from the friction of their linear transmission device, as well as vapors of the used lubricating oils or greases, from escaping outside and thus possibly contaminating the fabrication equipment and environment, such contamination can be still witnessed in practical use of the linear modules.

It has been widely recognized by persons skilled in the art that the contamination is a consequence of particles straying from the modules due to insufficient sealing, e.g., between the sealing band and the output opening. In addition, persons skilled in the art have also noticed, during their maintenance work, that particles will accumulate where the sealing band is connected to the linear transmission device with use of the module over time.

In order that the output end of the linear transmission device can be connected to an external actuator, it is necessary to arrange, between the sealing band and output opening, a gap that communicates with the outside and can move with the output end when the output end of the linear transmission device is moving relative to the casing. In most current practices, such a gap between the sealing band and the output opening is created by lifting the sealing band at the output end, and the gap moves with the output end. During the movements of the output end, the sealing band lifted previously will again cover the output opening after the output end is moved away, so as to seal again the output opening. In this way, it can be seen that, in operation of the module, there will be always a gap between the output end and the output opening for facilitating the connection between the output end and the external actuator. Therefore, persons skilled in the art believe that the particles mentioned above come out from the gap.

Further, the inventors have found that such a linear module tends to exhibit degradations in terms of accuracy, motion smoothness and sealing performance over time due to deformation and wear of the sealing band.

Through extensive experimentation and analysis, the inventors have identified the main source of the stray particles as sliding friction between the linear transmission device's output end and the sealing band. Accordingly, the inventors propose herein a linear module allowing reduced friction between output end and the sealing band, thus enabling high cleanliness and providing good sealing performance, high accuracy and high stability.

The linear module proposed herein will be described in greater detail below with reference specific embodiments and to the accompanying drawings. Note that the accompanying drawings are provided in a very simplified form not necessarily presented to scale, and their only intention is to facilitate convenience and clarity in explaining the disclosed embodiments.

According to an embodiment, the linear module includes a casing and a linear transmission device 20. The casing has an internal cavity in which the linear transmission device 20 is at least partially disposed. The casing defines a output opening 31 extended horizontally, and a sealing band 32 is disposed at the output opening 31. The sealing band 32 may have a length matching that of the output opening 31. While the output opening 31 and sealing band 32 are shown to both have elongated shapes, it is a matter of course that they may have different shapes. The linear module further includes a second rolling mechanism 40 movable in synchronization with the linear transmission device. The second rolling mechanism 40 is placed at a side of the sealing band 32 facing towards the internal cavity and is in rolling contact with the sealing band 32 so that the sealing band 32 can roll with respect to the second rolling mechanism 40. By lifting, along a direction away from the internal cavity, a portion of the sealing band 32 which is in contact with the second rolling mechanism 40, a gap between the output opening 31 and the portion can be formed.

The casing may include a base 10 and a cover 30 fixedly connected to the base 10. The linear transmission device 20 extends horizontally and is mounted on the base 10 so that it is at least partially disposed within the closed internal cavity delimited by the base 10 and cover 30.

Figure 2:
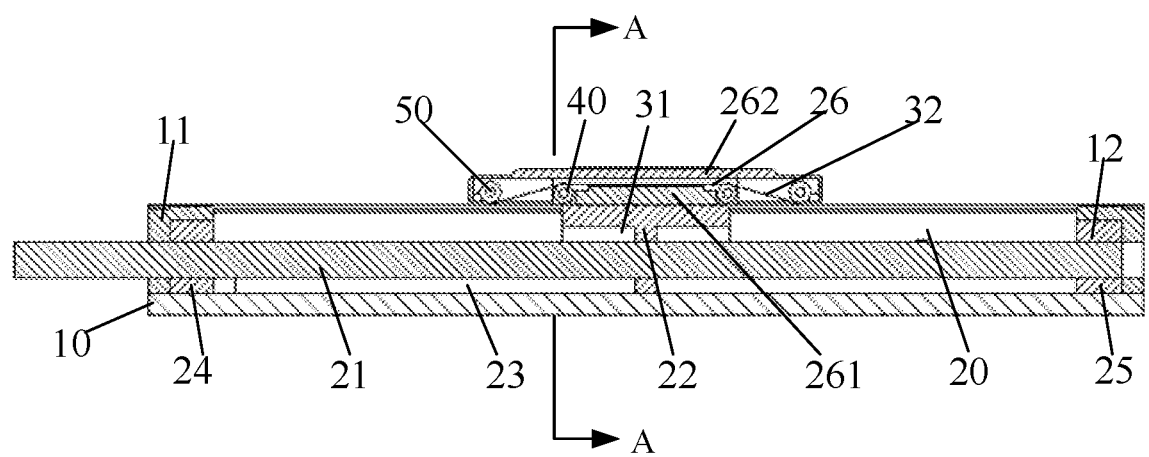
FIG. 2 is a cross-sectional view of the linear module, taken along a movement direction of a slide table, in accordance with an embodiment.

Referring to FIG. 2, the linear transmission device 20 may include a lead screw 21, nut 22, a guide rail 23, a front bearing 24, a rear bearing 25, a front sleeve (not shown), a rear sleeve (not shown), a front wall (not shown), a rear wall (not shown) and a slide table 26. Moreover, a front holder 11 and a rear holder 12 may be fixed to the base 10.

A front end of the lead screw 21 may be rotatably connected to the front holder 11 via the front bearing 24. In addition, the front end of the lead screw 21 may extend through the front holder 11 and connect driving apparatus (e.g., a motor). A rear end of the lead screw 21 may be rotatably connected to the rear holder 12 by means of the rear bearing 25. The cover may define an opening at one end thereof, through which the lead screw 21 can be inserted. The front sleeve and front wall may both sleeve over the front end of the lead screw 21 so that they are respectively located on opposing sides of the front bearing 24. The front wall may be disposed on the side of the front bearing 24 that is farther away from the nut 22. The front sleeve may be configured to fix an outer ring of the front bearing 24, while the front wall may be configured to fix an inner ring thereof.

The rear sleeve and rear wall may both sleeve over the rear end of the lead screw 21 so that they are respectively located on opposing sides of the rear bearing 25. The rear wall may be disposed on the side of the rear bearing 25 that is farther away from the nut 22. The rear sleeve may be configured to fix an outer ring of the rear bearing 25, while the rear wall may be configured to fix an inner ring thereof. The front and rear walls may be fixed to the front and rear holders 11, 12, respectively.

Figure 3:
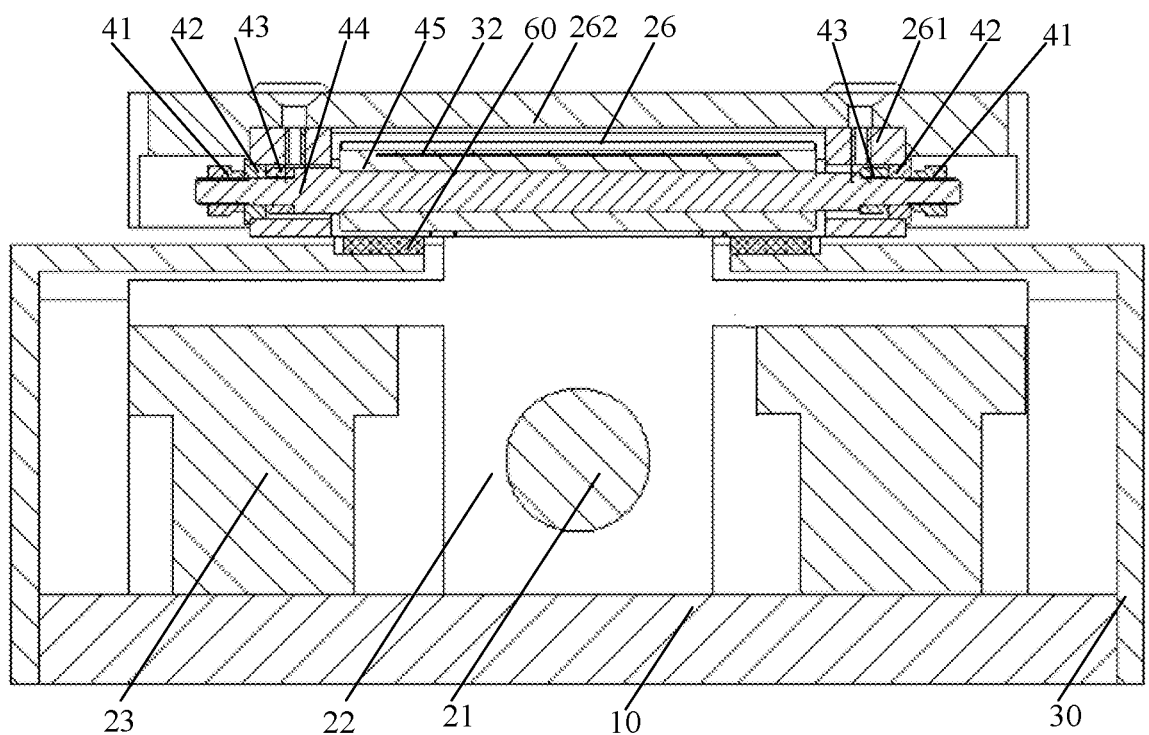
FIG. 3 is a cross-sectional view of the linear module, taken along an axis of a second rolling mechanism, in accordance with an embodiment.
Figure 4:
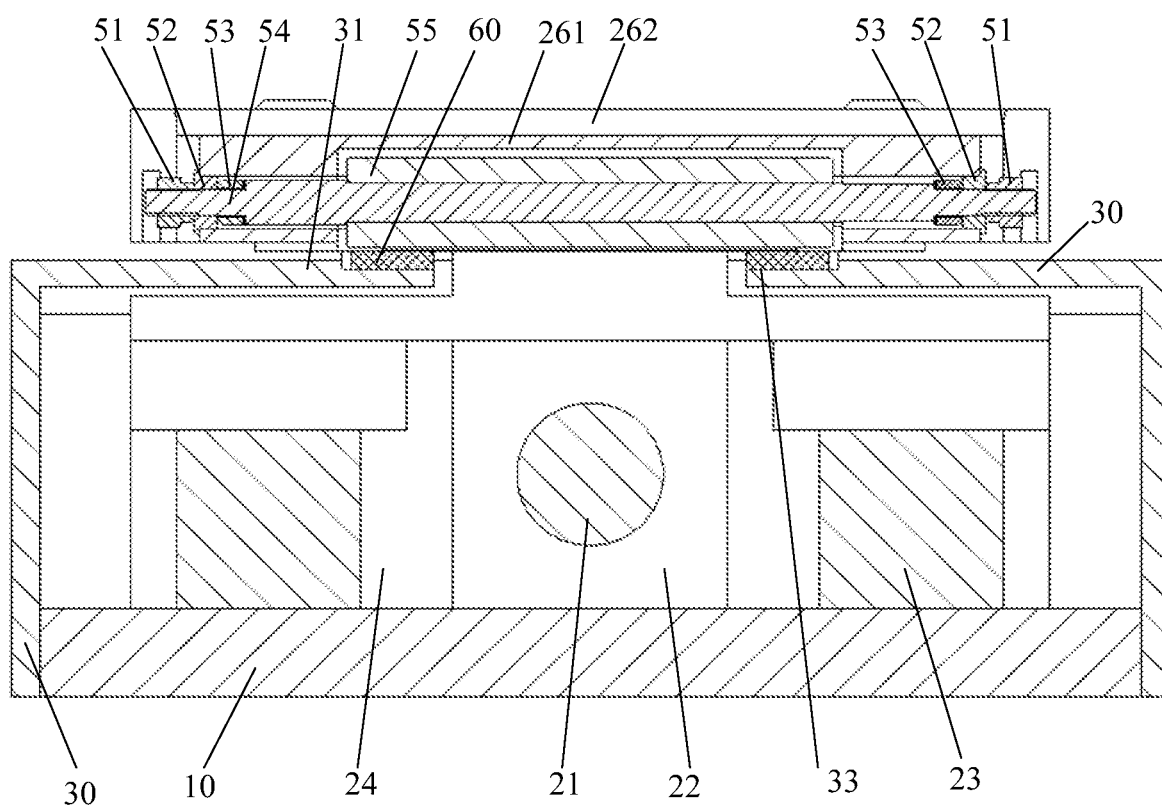
FIG. 4 is a cross-sectional view of the linear module, taken along an axis of a first rolling mechanism, in accordance with an embodiment.

Referring to FIGS. 2, 3 and 4, the nut 22 may be fixedly connected to the slide table 26, and the guide rail 23 may be fixed to the base 10. The guide rail 23 may be configured to support and guide the slide table 26. When the lead screw 21 rotates, the nut 22 may move linearly along an axis of the lead screw 21.

Referring to FIG. 2, the cover 30 may further define output opening 31, and the slide table 26 may extends through the output opening 31 and be connected to an actuator. Specifically, according to this embodiment, the output opening 31 may be an elongated opening. In other embodiments, the output opening may assume any other suitable shape such as oblong, etc.

Referring to FIGS. 1 and 2, the sealing band 32 is arranged on the cover 30 so that the sealing band 32 extends through the slide table 26 and covers the output opening 31, with its opposing ends which extend along a sliding direction of the slide table 26 coming into contact with the cover 30 and its opposing ends which extend along a direction perpendicular to the sliding direction of the slide table 26 fixed to the cover 30. Preferably, the sealing band 32 is a steel band.

The cover 30 may be provided thereon, e.g., in a side face thereof, with an exhaust port 34 through which particles inside the linear module can be evacuated.

Referring to FIGS. 2, 3 and 4, the second rolling mechanism 40 is provided on the slide table 26. Specifically, second rolling mechanism 40 is rotatably connected to the slide table 26 so that the axis of the second rolling mechanism 40 is perpendicular to the movement direction of the slide table 26 and the second rolling mechanism 40 itself comes into contact with the side of the sealing band 32 facing toward the cavity. During advancement of the slide table 26, the second rolling mechanism 40 lifts the portion of the sealing band 32 which is in front of the second rolling mechanism 40 in the advancement direction from the cover 30 so that only the side of the sealing band 32 facing toward the cavity is in contact with the second rolling mechanism 40. As such, compared with the conventional technique where there was sliding friction between the sealing band 32 and slide table 26, the sealing band 32 interacts with the second rolling mechanism 40 by rolling friction, which allows less frictional resistance on the slide table 26 during its sliding and reduced particle generation from the friction between the sealing band 32 and the second rolling mechanism 40. As a result, it is less possible for the sealing band 32 to deform due to wear from significant friction or significant particle generation, reducing the likelihood of deformation and wear of the sealing band 32 which is caused by large friction and particles. As a result, a lowered cleanliness of the fabrication equipment and environment, which is caused by the particles and a degraded sealing performance of the sealing band caused by deformation thereof, can be avoided. In addition, a lowered motion smoothness of the slide table (i.e., a lowered accuracy and stability of the linear module), which is caused by deformation of the sealing band and particles, can also be avoided.

The slide table 26 may also be provided thereon with a first rolling mechanism 50 extending perpendicular to the movement direction of the slide table 26. The first rolling mechanism 50 may be rotatably connected to the slide table 26 and brought into contact with the side of the sealing band 32 facing away from the cavity. The first rolling mechanism 50 is preferably located close to an edge of the slide table 26, while the second rolling mechanism 40 may be optionally located inside the slide table 26. As such, with both surfaces of the sealing band 32 respectively in contact with the second and first rolling mechanisms 40, 50, less frictional resistance and reduced generation of particles from friction can be achieved. Additionally, the first rolling mechanism 50 arranged close to an edge of the slide table 26 can press the sealing band 32 toward the cover 30, minimizing the gap between the sealing band 32 and the cover 30 during sliding of the slide table 26. This is helpful in preventing the egress of particles from the linear module, which may adversely affect the cleanliness of the fabrication equipment and environment.

The slide table 26 may include an adapter 261 and a slide block 262 fixedly connected to the adapter 261. The adapter 261 and slide block 262 may be provided either as separate components or as an integral piece. The sealing band 32 may be inserted between 261 and 262 over the output opening 31. The second and first rolling mechanisms 40, 50 may be arranged both on the adapter 261, or both on the slide block 262, or on the adapter 261 and slide block 262, respectively. In case of the slide block 262 and adapter 261 being provided as separate components, they may be more easily fabricated at lower cost and facilitate the assembly and maintenance of the slide block 262, the adapter 261 and the second and first rolling mechanisms 40, 50.

Preferably, referring to FIG. 2, two second rolling mechanisms 40 may be provided at a certain interval along the movement direction of the slide table 26, and a same number of first rolling mechanisms 50 as those of the second rolling mechanisms 40 may be symmetrically arranged external to the second rolling mechanisms 40.

The two second rolling mechanisms 40 may be disposed symmetrically on the adapter 261, while the two first rolling mechanisms 50 may be disposed symmetrically on the slide block 262, so that the second rolling mechanisms 40 are close to and in one-to-one correspondence with the respective first rolling mechanisms 50. In this case, at each end of the slide table 26, one of the second rolling mechanisms 40 and a corresponding one of the first rolling mechanisms 50 may be so provided as to allow a rolling connection between the sealing band 32 and the second rolling mechanism 40, resulting in a frictional resistance in movements of the slide table 26. Additionally, since the first rolling mechanism is arranged external and close to the second rolling mechanism 40 with respect to the slide table 26, when the slide table 26 is moving, it is ensured that the sealing band 32 is partially lifted to make the movement of the slide table 26 easier, while minimizing the height and length of the lifted part along the movement direction of the slide table 26, i.e., minimizing the size of the gap created between the sealing band 32 and the cover 30 at the slide table 26. This can help in imparting good sealing ability to the linear module. Further, in case of two pairs of the second and first rolling mechanisms 40, 50 being arranged symmetrically on the slide table 26 along the movement direction thereof, with the first rolling mechanisms 50 being arranged at given positions, the two second rolling mechanisms 40 may be disposed internal and close to the respective first rolling mechanisms, thus ensuring rolling contact between the sealing band 32 and the first and second rolling mechanisms 50, 40, while minimizing the gaps between the first rolling mechanisms 50 and the respective second rolling mechanisms 40, i.e., the gaps between the sealing band 32 and cover 30 at the slide table 26, which is conducive to the sealing performance. Furthermore, a smaller space is allowed between the slide block 262 and adapter 261, which is helpful in improving stability of the slide table 26.

FIG. 3 is a cross-sectional view of the linear module taken along an axis of the second rolling mechanism, i.e., line AA in FIG. 2. Referring to FIG. 3, the second rolling mechanism 40 may include second bearing adjusting nuts 41, second bearings 42, second stop rings 43, a second support shaft 44 and a second wear-resistant rolling member 45. The second bearings 42 sleeve over different ends of the second support shaft 44 and fixed to the slide table 26, the second wear-resistant rolling member 45 is fixedly arranged over the second support shaft 44, each of the second stop rings 43 sleeves over the second support shaft 44 on the side of a corresponding one of the second bearings 42 closer to the second wear-resistant rolling member 45 and configured to fix an outer ring of the specific second bearing 42, each of the second bearing adjusting nuts 41 sleeves over the second support shaft 44 on the side of a corresponding one of the second bearings 42 farther away from the second wear-resistant rolling member 45 and configured to fix an inner ring of the specific second bearing 42.

Referring to FIG. 4, the first rolling mechanism 50 may include first bearing adjusting nuts 51, first bearings 52, first stop rings 53, a first support shaft 54 and a first wear-resistant rolling member 55. The first bearings 52 sleeves over respective ends of the first support shaft 54 and fixed to the slide table, the first wear-resistant rolling member 55 is fixedly arranged over the first support shaft 54, each of the first stop rings 53 sleeves over the first support shaft 54 on the side of a corresponding one of the first bearings 52 closer to the first wear-resistant rolling member 55 and configured to fix an outer ring of the first bearing 52, each of the first bearing adjusting nuts 51 sleeves over the first support shaft 54 on the side of a corresponding one of the first bearings 52 farther away from the first wear-resistant rolling member 55 and configured to fix an inner ring of the first bearing 52.

The second wear-resistant rolling member 45 is preferably made of a lightweight wear-resistant material so that it can facilitate discharging particles generated at the second rolling mechanism 40 while allowing smooth interaction of the sealing band 32 with the second rolling mechanism 40 or first rolling mechanism 50.

The first wear-resistant rolling member 55 is preferably made of a magnetic wear-resistant material so that it can absorb and trap metal particles generated at the first rolling mechanism 50 while allowing smooth interaction of the sealing band 32 with the first rolling mechanism 50.

According to this embodiment, the cover 30 may be further provided with grooves 33 in which magnetic strips 60 are accommodated. The magnetic strips 60 may extend on both sides of the output opening 31 along the movement direction of the slide table 26 and be covered by the sealing band 32. This enables good sealing performance of the module, real-time collection of metal particles generated in a minor amount from the rolling friction, which may drop onto other components and accordingly adversely affect the cleanliness of other components, and convenient maintenance.

During the movement of the slide table 26 of the linear module, the driving apparatus causes the lead screw 21 to rotate so that the nut 22 will move linearly in response, thereby driving the slide table 26 to move linearly. The slide table 26 will in turn drive the actuator thereon to move therewith, during which the second and first rolling mechanisms 40, 50 will roll relative to the sealing band 32, concurrently with the second rolling mechanism 40 lifting the portion of the sealing band 32 which is in front of the second rolling mechanism 40 in the advancement direction from the cover 30 and with the magnetic strip 60 attracting any appropriate portion of the sealing band 32 onto the cover 30.

According to this embodiment, the slide table 26 may be alternatively disposed within the casing, with an external connecting member being inserted through the gap between the output opening 31 and the sealing band 32 to connect to the slide table 26.

According to this embodiment, the second rolling mechanism 40 or first rolling mechanism 50 may be provided on, and movably connected to, the casing and fixed to an output end of the linear transmission device 20 via connecting means so that the second rolling mechanism 40 or first rolling mechanism 50 is movable relative to the casing as well as being able to roll by itself.

According to this embodiment, the lead screw 21 may be connected to the cover 30 via components different from those as described hereinabove. For example, the connection between each of the front and rear bearings may be alternatively accomplished by a combination of a lock nut and a sleeve, or of an end cap and a stop ring, or of a lock nut and a stop ring, or of a lock screw and a stop ring, or the like. Alternatively, each of the front and rear bearings may be a roller bearing or any other suitable bearing. Alternatively, the lead screw and nut may form a ball screw and nut pair. Alternatively, the guide rail may be a linear slide rail. In this case, the adapter may be fixed to a nut on the linear slide rail.

According to this embodiment, the linear transmission device 20 may also be any other suitable mechanism that provides linear motion, such as a belt transmission mechanism (not shown), in which, the slide table 26 is fixed to a belt that can be driven forward and backward to cause the slide table to slide on the guide rail. Specifically, in this case, the linear transmission device may include the belt, a slide table, a guide rail, a front belt pulley, a rear belt pulley, a front support shaft and a rear support shaft. More specifically, the linear transmission device may include the belt, the slide table fixed to the belt and the guide rail disposed on the base or on the cover to support the slide table, a front belt pulley and a rear belt pulley, both operating in cooperation with the belt, and a front support shaft and a rear support shaft for supporting the front belt pulley and rear belt pulley, respectively. The slide table is configured to move linearly relative to the base. The front and rear support shafts are rotatably disposed on the cover, and the front support shaft protrudes out of the cover to connect driving apparatus.

This embodiment also provides an operating method of a linear module including a casing, a linear transmission device and a second rolling mechanism. The casing has an internal cavity, in which the linear transmission device is at least partially disposed, and an output opening provided on the casing with a sealing band. The method includes: causing a first rolling mechanism to move in synchronization with the linear transmission device to cause the first rolling mechanism to roll under the action of the sealing band; and pressing, by the first rolling mechanism, a portion of the sealing band that is lifted by the second rolling mechanism toward the internal cavity.

The linear module may further include the first rolling mechanism, wherein the method further includes: causing the second rolling mechanism to move in synchronization with the linear transmission device to cause the second rolling mechanism to roll under the action of the sealing band; and lifting, by the second rolling mechanism, a portion of the sealing band that comes into contact therewith, from the output opening away from the internal cavity, thus forming a gap.

In summary, the linear module according to the present invention is particularly suitable for use in the cases requiring high cleanliness of fabrication environment and equipment.

Compared with the prior art, in the linear module according to the present invention, the sealing band 32 is in rolling contact with the second rolling mechanism. During advancement of the slide table 26, rolling friction, rather than sliding friction, occurs between the sealing band 32 and slide table 26. This reduces the amount of particles generated from sliding friction caused by the relative movement between sealing band and slide table and lowers the likelihood of the sealing band's wear and deformation under a significant frictional force or under the action of said particles, avoiding the situation that the cleanliness of the fabrication equipment and environment is negatively influenced by the particles, also avoiding the situation that the sealing ability of the linear module is degraded with the deformation of the sealing band, which leads to a further negative influence on cleanliness of the fabrication equipment and environment, also avoiding the situation that the smoothness of the linear transmission device in its movements is negatively influenced due to the deformation of the sealing band and the presence of the particles. As a result, high accuracy and stability of the linear module can be ensured.

Additionally, the linear module is provided with the first rolling mechanism 50 and the second rolling mechanism 40, and the two sides of the sealing band are in rolling contact with the first rolling mechanism 50 and the second rolling mechanism 40 respectively. Therefore, reductions in frictional resistance and hence in particle generation can be obtained. Moreover, the first rolling mechanism is arranged in the vicinity of an edge of the slide table 26, so that the sealing band can be pressed toward the cover, minimizing the size of the gap formed between the sealing band and the cover during movement of the linear transmission device and hence the possibility of particles escaping from the inside of the linear module to the fabrication equipment and environment.

The magnetic strips 60 are covered with the sealing band 32 which is arranged on the cover, so that the sealing performance is increased and a small amount of the metal particles which are generated from the rolling friction can be collected in real time, thereby preventing other components of the fabrication equipment from of the dropped metal particles, which harms the cleanliness thereof. Additionally, this is also helpful in the cleaning and maintenance of the linear module.

The description presented above is merely that of a few preferred embodiments of the present invention and does not limit the scope thereof in any sense. Any and all changes and modifications made by those of ordinary skill in the art based on the above teachings fall within the scope as defined in the appended claims.

What is claimed is:
1. A linear module, comprising:
a casing; and
a linear transmission device,
wherein the casing has an internal cavity in which the linear transmission device is at least partially disposed, the casing defines thereon an output opening which extends along a movement direction of the linear transmission device, a sealing band is provided at the output opening, wherein the linear module further comprises a first rolling mechanism which is moveable in synchronization with the linear transmission device, the first rolling mechanism is arranged on a side of the sealing band that is away from the internal cavity, and the first rolling mechanism is in rolling contact with the sealing band;

wherein the linear module further comprises a second rolling mechanism which is moveable in synchronization with the linear transmission device, the second rolling mechanism is arranged on a side of the sealing band that faces towards the internal cavity, and the second rolling mechanism is in rolling contact with the sealing band;

wherein the first rolling mechanism comprises a first rolling member which is in rolling contact with the sealing band, and the first rolling member is made of a magnetic material;

wherein the first rolling mechanism further comprises:
first bearing adjusting nuts,
first bearings,
first stop rings, and
a first support shaft,
wherein the first bearings are sleeved over respective ends of the first support shaft and are fixed to a slide table, the first rolling member is fixed over the first support shaft, each of the first stop rings is sleeved over the first support shaft and is closer to the first rolling member and is configured to fix an outer ring of a corresponding one of the first bearings, each of the first bearing adjusting nuts is sleeved over the first support shaft and is farther away from the first rolling member and is configured to fix an inner ring of a corresponding one of the first bearings.

2. The linear module of claim 1, wherein a number of the second rolling mechanism is more than one and a number of the first rolling mechanisms is more than one, wherein the first rolling mechanisms are disposed symmetrically on opposing sides of the second rolling mechanisms along the movement direction of the linear transmission device.

3. The linear module of claim 1, wherein
a number of the second rolling mechanisms is more than one, wherein the second rolling mechanisms are spaced apart from one another along the movement direction of the linear transmission device;
a number of the first rolling mechanisms is two, wherein the first rolling mechanisms are disposed symmetrically on opposing sides of the second rolling mechanisms along the movement direction of the linear transmission device.

4. The linear module of claim 3, wherein the number of the second rolling mechanisms is two.

5. The linear module of claim 1, wherein the slide table is configured for linear movement, the first rolling mechanism and the second rolling mechanism are arranged on and in rolling connection with the slide table.

6. The linear module of claim 5, wherein the first rolling mechanism is at a distance from an edge of the slide table and the second rolling mechanism is disposed inside the slide table.

7. The linear module of claim 5, wherein the slide table comprises an adapter and a slide block fixed to the adapter, and wherein the second rolling mechanism and first rolling mechanism are arranged on the adapter and/or the slide block.

8. The linear module of claim 1, wherein the second rolling mechanism comprises a second rolling member which is in rolling contact with the sealing band.

9. The linear module of claim 8, wherein the second rolling mechanism further comprises:
second bearing adjusting nuts,
second bearings,
second stop rings, and
a second support shaft,
wherein the second bearings are sleeved over respective ends of the second support shaft and are fixed to the slide table, the second rolling member is fixed over the second support shaft, each of the second stop rings is sleeved over the second support shaft and is closer to the second rolling member and is configured to fix an outer ring of a corresponding one of the second bearings, each of the second bearing adjusting nuts is sleeved over the second support shaft and is farther away from the second rolling member and is configured to fix an inner ring of a corresponding one of the second bearing.

10. The linear module of claim 1, wherein the casing comprises a base and a cover arranged on the base, the internal cavity is formed between the base and the cover, the cover is provided with magnetic strips extending on both sides of the output opening along the movement direction of the linear transmission device, and the sealing band covers at least a part of each of the magnetic strips.

11. The linear module of claim 10, wherein the cover is provided with a front holder and a rear holder, and wherein the linear transmission device comprises a lead screw, a nut, a guide rail and second bearings, all disposed within the casing, and the slide table disposed at least partially outside the casing, one end of the lead screw is disposed at the front holder via one of the second bearings and extends through the front holder and is coupled to a driving apparatus arranged outside the casing, a further end of the lead screw is rotatably connected with the rear holder via a further one of the second bearings, the nut is movably disposed over the lead screw and is connected to the slide table, the guide rail is disposed on the base, and the slide table is movably disposed on the guide rail.

12. An operating method of a linear module, wherein the linear module comprises a casing, a linear transmission device and a first rolling mechanism, wherein the casing has an internal cavity in which the linear transmission device is at least partially disposed, the casing defines thereon an output opening and a sealing band is provided at the output opening, and wherein the operating method comprises:
causing the first rolling mechanism to move in synchronization with the linear transmission device, during which the first rolling mechanism rolls relative to the sealing band; and
pressing, by the first rolling mechanism, a portion of the sealing band that is interacting with the linear transmission device toward the internal cavity;
wherein the linear module further comprises a second rolling mechanism which is moveable in synchronization with the linear transmission device, the second rolling mechanism is arranged on a side of the sealing band that faces towards the internal cavity, and the second rolling mechanism is in rolling contact with the sealing band;

wherein the first rolling mechanism comprises a first rolling member which is in rolling contact with the sealing band, and the first rolling member is made of a magnetic material;

wherein the first rolling mechanism further comprises first bearing adjusting nuts, first bearings, first stop rings and a first support shaft, wherein the first bearings are sleeved over respective ends of the first support shaft and are fixed to a slide table, the first rolling member is fixed over the first support shaft, each of the first stop rings is sleeved over the first support shaft and is closer to the first rolling member and is configured to fix an outer ring of a corresponding one of the first bearings, each of the first bearing adjusting nuts is sleeved over the first support shaft and is farther away from the first rolling member and is configured to fix an inner ring of a corresponding one of the first bearings.

13. The operating method of the linear module of claim 12, wherein the operating method further comprises:

causing the second rolling mechanism to move in synchronization with the linear transmission device, during which the second rolling mechanism rolls relative to the sealing band; and lifting, by the second rolling mechanism, a portion of the sealing band that comes into contact with the second rolling mechanism, from the output opening in a direction away from the internal cavity, to form a gap.

* * * * *